H. A. WELTON.
ATTACHMENT FOR RUBBER MIXING MILLS.
APPLICATION FILED JUNE 6, 1918.

1,345,426.

Patented July 6, 1920.
2 SHEETS—SHEET 1.

Inventor.
Harry A. Welton,
By his Attorney.
Ernest Hopkinson

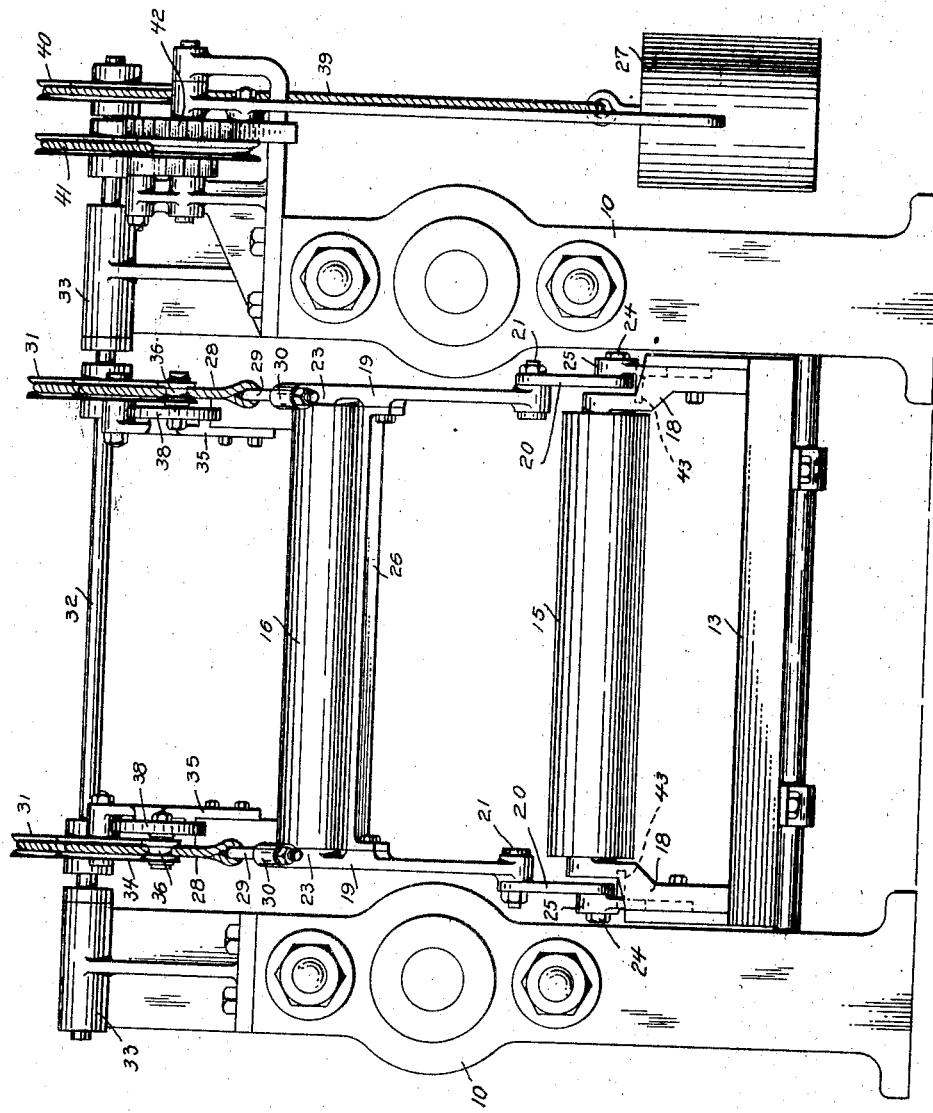

UNITED STATES PATENT OFFICE.

HARRY ALLEN WELTON, OF DETROIT, MICHIGAN, ASSIGNOR TO MORGAN & WRIGHT, A CORPORATION OF MICHIGAN.

ATTACHMENT FOR RUBBER-MIXING MILLS.

1,345,426.  Specification of Letters Patent.  Patented July 6, 1920.

Application filed June 6, 1918. Serial No. 238,552.

*To all whom it may concern:*

Be it known that I, HARRY A. WELTON, a citizen of the United States, residing at Detroit, county of Wayne, and State of Michigan, have invented certain new and useful Improvements in Attachments for Rubber-Mixing Mills, of which the following is a full, clear, and exact description.

The endless feed apron applied to rubber mixing mills for the purpose of catching the rubber and compounding ingredients which drop after passing between the mixing rolls and returning said material to the batch is customarily trained over three rollers, two of which are permanently mounted and located below the mixing rolls while the other roller, which for purposes of description will be designated the "apron adjusting roller" is adjustably mounted to be raised to bring the mixing apron into driving contact with one of the mixing rolls or to be lowered to drop the apron away from the mixing rolls enabling the operator to slice the rubber batch to effect a more efficient mixing and to remove the batch from the mill when the mixing is completed. In order to provide for the desired adjustment of the apron adjusting roller it is customarily journaled in a pair of brackets slidably mounted upon straight guide rods pivoted to the pan of the apparatus. These guide rods cannot be moved completely out of the operator's way and consequently constitute a source of serious interference with his work.

An object of the present invention, accordingly, is to provide an improved supporting mechanism for the apron adjusting roller, capable of adjustment to a position affording the operator substantially unobstructed access to the mixing rolls.

Other objects of the invention will hereinafter appear.

In the accompanying drawings:

Fig. 2 is a front elevation of the mill shown in Fig. 1, the mixing rolls and feed apron being removed.

Figure 1:
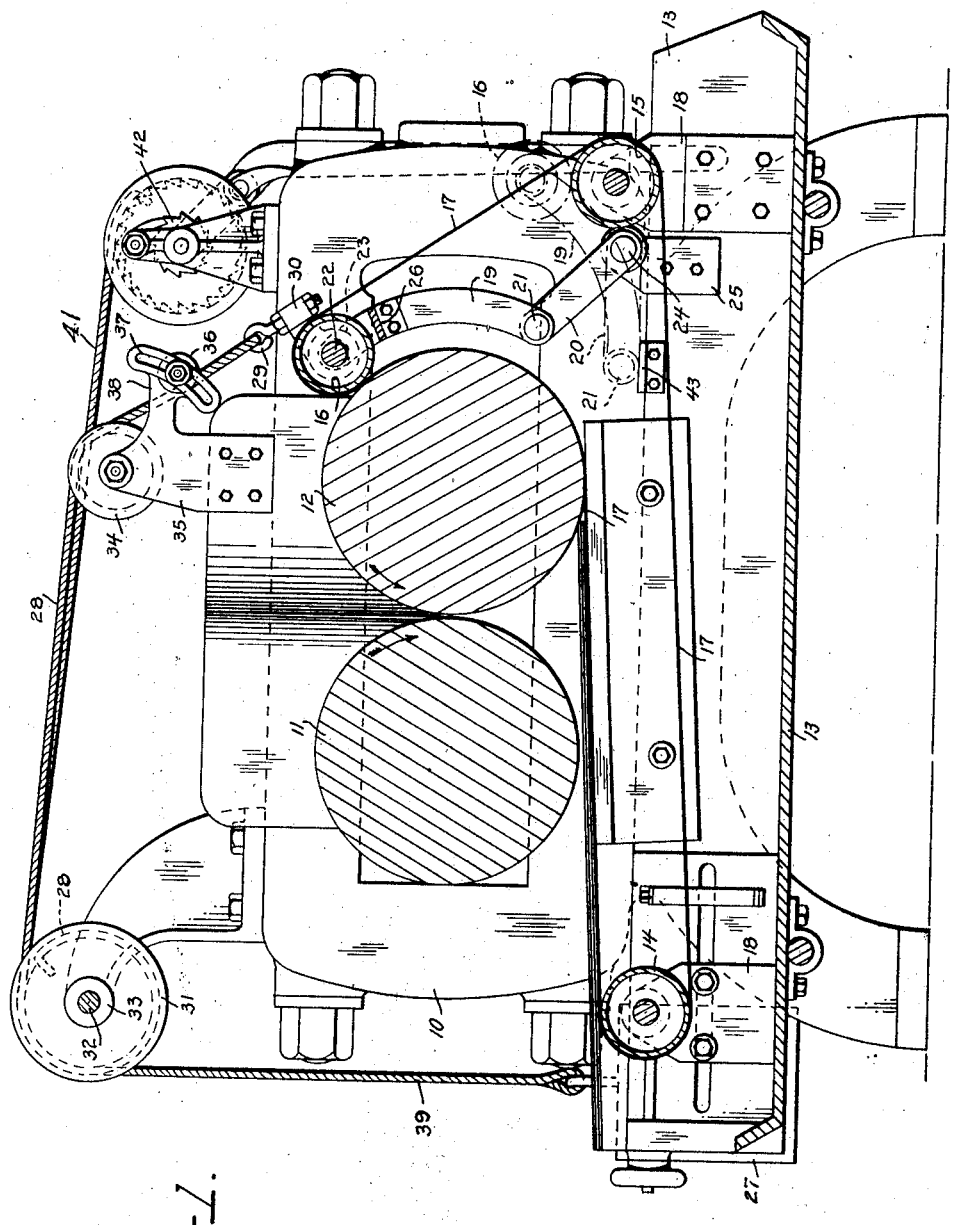
Figure 1 is a longitudinal sectional view of a mixing mill equipped with my improved mechanism.

The rubber mixing mill illustrated in the drawings comprises a frame 10, upon which are mounted the mixing rolls 11 and 12 adapted to be simultaneously driven in opposite directions by suitable driving instrumentalities, not shown. Removably supported beneath the mixing rolls is a pan 13 upon which are secured the rollers 14, 15 and 16 that carry the endless feed apron 17. These apron rollers are arranged with their axes parallel with the axes of the mixing rolls and are so mounted that they may assume the operating position relative to the mixing rolls which is shown in Fig. 1 whereby the apron will pass beneath the two mixing rolls and then be held up against a part of the surface of the mixing roll 12 which serves to drive the apron in a direction to cause it to deliver back to the batch any material which may have fallen therefrom. Two of the apron rollers, 14 and 15, are mounted below the mixing rolls in brackets 18 secured to the pan 13, while the apron adjusting roller 16 is mounted in a foldable frame capable of adjustment to support the roller in a raised position with the feed apron in driving engagement with the mixing roll 12, and in a lowered position with the feed apron disposed away from the mixing roll to afford the operator free access to the rubber batch.

The foldable frame comprises two side members each composed of a curved link 19 and a straight link 20, the two links of each member being hingedly secured together by a bolt 21. The ends of the axle 22 of the apron adjusting roller are journaled in the enlargements 23 formed at the upper ends of the curved links. The lower ends of the straight links are hingedly secured by bolts 24 to the brackets 25 attached to the pan 13 of the mill. A horizontal brace 26 connects the two curved links together and serves to strengthen the frame. By referring to the drawings, it will be seen that the frame by reason of its hinged construction, is capable of being folded to lower the apron adjusting roller to withdraw the feed apron away from the mixing roll, or extended to raise the roller to bring the apron into driving and delivery contact with the mixing roll.

For the purpose of yieldingly holding the roller 16 and foldable frame in their raised or operative position in which position the endless apron will be held in driving engagement with the mixing roll 12, a counterweight 27 is provided. This counterweight is operatively connected to the roller 16 through the instrumentality of cables 28 connected at their forward ends to the eye bolts 29 secured to the extensions 30 provided at the upper ends of the curved links 19. The rear ends of the cables 28 are secured to respective grooved pulleys 31 fixed to a shaft 32 journaled in bearings 33 secured to the frame of the mill. In passing from the eye bolts 29 to the pulleys 31 the cables 28 are led over guide pulleys 34 mounted on brackets 35 bolted to the frame of the mill. Additional guide pulleys 36, adapted to urge the apron roller 16 toward the mill roll 12, are also provided for the cables 28. These last mentioned pulleys are mounted for adjustment in arcuate shaped slots 37 provided in the extensions 38 of the pulley brackets 35.

The counterweight is secured by a cable 39 to a grooved pulley 40 fixed to the shaft 32 and by its weight functions to turn the shaft with consequent winding of the cables 28 on their pulleys 31, whereby the roller 16 is yieldingly pulled upwardly. By virtue of the play permitted by the foldable frame and the counterweight apparatus, the apron is permitted to yield to compensate for such inequalities as occur in the thickness of batch which adheres to the mixing roll 12 in layer form. It will be noted that when the roller 16 is in operative position the folding or extensible frame 19, 20 is not entirely drawn out, hence when inequalities in the batch on the roll 12 pass between the roll and apron, the roller 16 can readily move downward to compensate for the downward pull on the apron. At the same time the lateral pressure of the roller 16 on the roll 12 and interposed apron is not appreciably varied, since this is governed by the position of the pulleys 36.

When it is desired to lower the roller 16 to withdraw the apron away from the mixing rolls, for the purpose of affording the operator access to the batch, the counterweight is drawn up through the instrumentality of the cable 41 and the pawl and ratchet windlass 42. It will be obvious that as the counterweight is raised the cables 28 unwind from their pulleys permitting the roller 16 to drop under the influence of gravity and the supporting frame to fold to the position indicated in dotted lines in Fig. 1 of the drawings. Stops 43 are provided, one bolted to each side of the pan 13, to limit the downward movement of the straight links 20 of the foldable frame.

An important advantage of the improved construction is that when the roller is adjusted to its lowermost position its supporting frame will be compactly folded out of the operator's way affording him unobstructed access to the rubber batch.

While I have described one of the preferred embodiments of my invention it is to be understood that various modifications may be restroted to without departing from the spirit and scope of the invention set forth in the appended claims.

Having thus described my invention what I claim and desire to protect by Letters Patent is:

1. An attachment for mixing rolls embodying a support adapted to be secured to a mill underneath the milling rolls thereof, a frame foldable upon itself and pivotally secured at one end to said support, and means secured to the other end of the frame for extending or folding it, a roller mounted in said frame, and an apron trained over said roller.

2. An attachment for mixing rolls embodying a support adapted to be secured to a mill underneath the milling rolls thereof, spaced rollers carried by said support, a roller carrying frame foldable upon itself and pivoted at its lower end to said support, means secured to the other end of the frame for resiliently extending it and urging its roller toward one of said milling rolls, and an endless apron trained over all of said rollers.

3. An attachment for mixing rolls embodying a support adapted to be secured to a mill underneath the milling rolls thereof, spaced rollers carried by said support, a foldable roller carrying frame pivoted at its lower end to said support, means secured to the upper end of said frame for resiliently urging its roller toward one of said milling rolls, stops carried by said support adapted to limit the folding movement of said foldable frame, and an endless apron trained over all of said rollers.

4. An attachment for mixing rolls embodying a support beneath the rolls, a hinged frame pivotally secured at one end to the support and carrying a roller adapted to co-act with one of said rolls, tensioning means connected to the other end of the frame for extending it and bringing its roller to operative position, and means for releasing said tensioning means to allow the frame and its roller to drop to inoperative position.

5. In an apparatus of the character described, mixing rolls, an apron coacting with said rolls, a roller adapted to hold said apron in contact with one of said mixing rolls, a pivotally mounted extensible frame for supporting said roller, and means secured to the free end of said frame for extending it, said means including means for varying the pressure of said roller against said roll.

6. In an apparatus of the character described, mixing rolls, an apron coacting with said rolls, a roller adapted in operative position to hold said apron in contact with one of said mixing rolls, a pivotally mounted frame extensible upon itself for supporting said roller, and gravity actuated means secured to the free end of said frame for extending it and moving said roller to operative position.

7. In an apparatus of the character described, mixing rolls, an apron coacting with said rolls, a roller adapted in operative position to hold said apron in contact with one of said mixing rolls, a pivotally mounted extensible frame for supporting said roller, gravity actuated means secured to the free end of said frame for extending it and moving said roller to operative position, and means for varying the lateral pressure of said roller.

8. In an apparatus of the character described, mixing rolls, an apron coacting with said rolls, a roller adapted in operative position to hold said apron in contact with one of said rolls, a frame extensible upon itself and pivotally mounted on a fixed support for supporting said roller, yieldable means secured to the free end of said frame for bringing said roller into operative position, and means for freeing said frame and roller from the influence of said yieldable means and allowing them to drop to inoperative position.

9. In combination with mixing rolls, a mixing apron, means for supporting the apron, and means for raising and lowering one of said supports for bringing said apron into and out of operable position, a sectional guiding frame pivotally anchored at its lower end and secured at its upper end to the last mentioned support, said sections being pivotally connected to permit the sections to fold together when the support is in lowered position, and of suitable lengths to permit of only partial unfolding when the said support is in raised position.

Signed at Detroit, Mich., this 31st day of May, 1918.

HARRY ALLEN WELTON.